United States Patent

[11] 3,592,277

[72] Inventor Peter Ackeret
Schutzeweg 3, 8700 Kusnacht, Zurich, Switzerland
[21] Appl. No. 809,845
[22] Filed Mar. 24, 1969
[45] Patented July 13, 1971
[32] Priority Mar. 22, 1968
[33] Switzerland
[31] 4327/68

[54] WEIGHING SCALE WITH CONTAINER STORAGE MEANS
4 Claims, 5 Drawing Figs.

[52] U.S. Cl. .................................................... 177/126, 177/232, 177/245, 177/154
[51] Int. Cl. ....................................................... G01g 21/00
[50] Field of Search........................................... 177/124, 126, 180, 232, 233, 245, 154

[56] References Cited
UNITED STATES PATENTS

| 374,759 | 12/1887 | Segog | 177/232 |
| 570,553 | 11/1896 | Hunter | 177/232 X |
| 817,974 | 4/1906 | Heizer | 177/126 |
| 873,850 | 12/1907 | Ellis | 177/233 X |
| 3,321,036 | 5/1967 | Keenan et al. | 177/245 |

Primary Examiner—Richard B. Wilkinson
Assistant Examiner—George H. Miller, Jr.
Attorney—Lowry, Rinehart, Markva & Smith ABSTRACT: A multipurpose scale construction, particularly for household kitchen use, comprises a base, a compressible spring mounted thereon, a platform on the spring and at least one container for holding material to be weighed. The container may be inverted over the platform and spring and secured to the base protecting the scales when not in use.

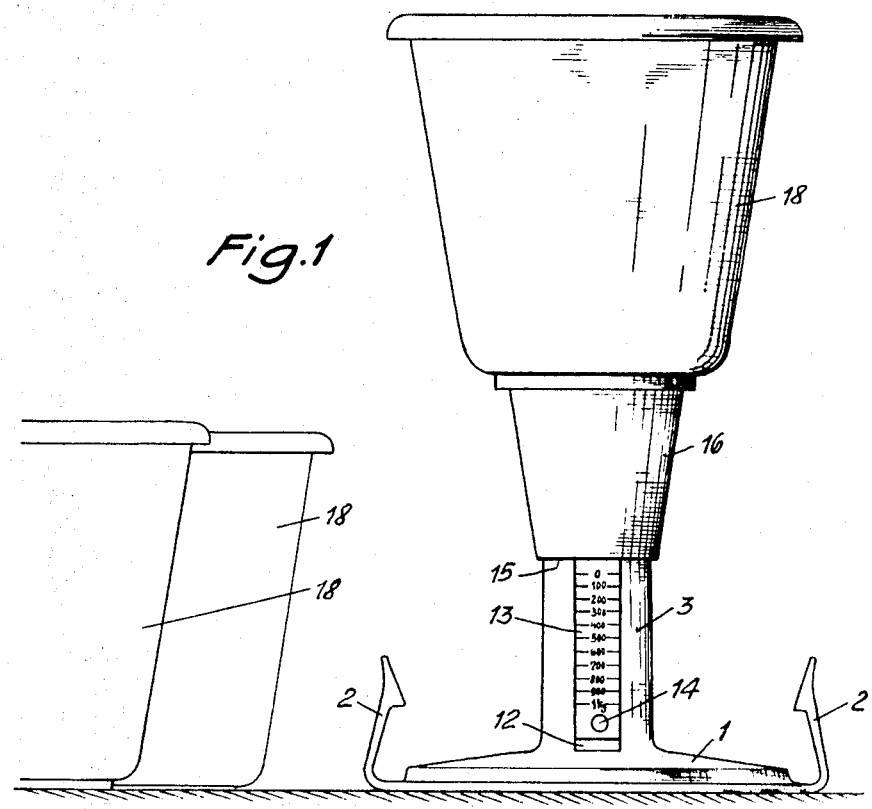

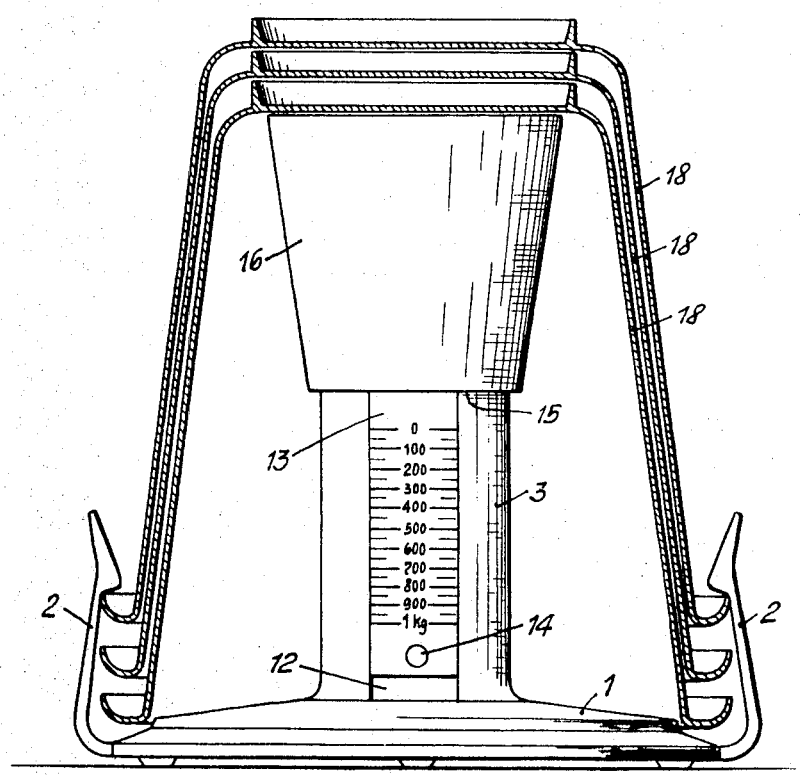

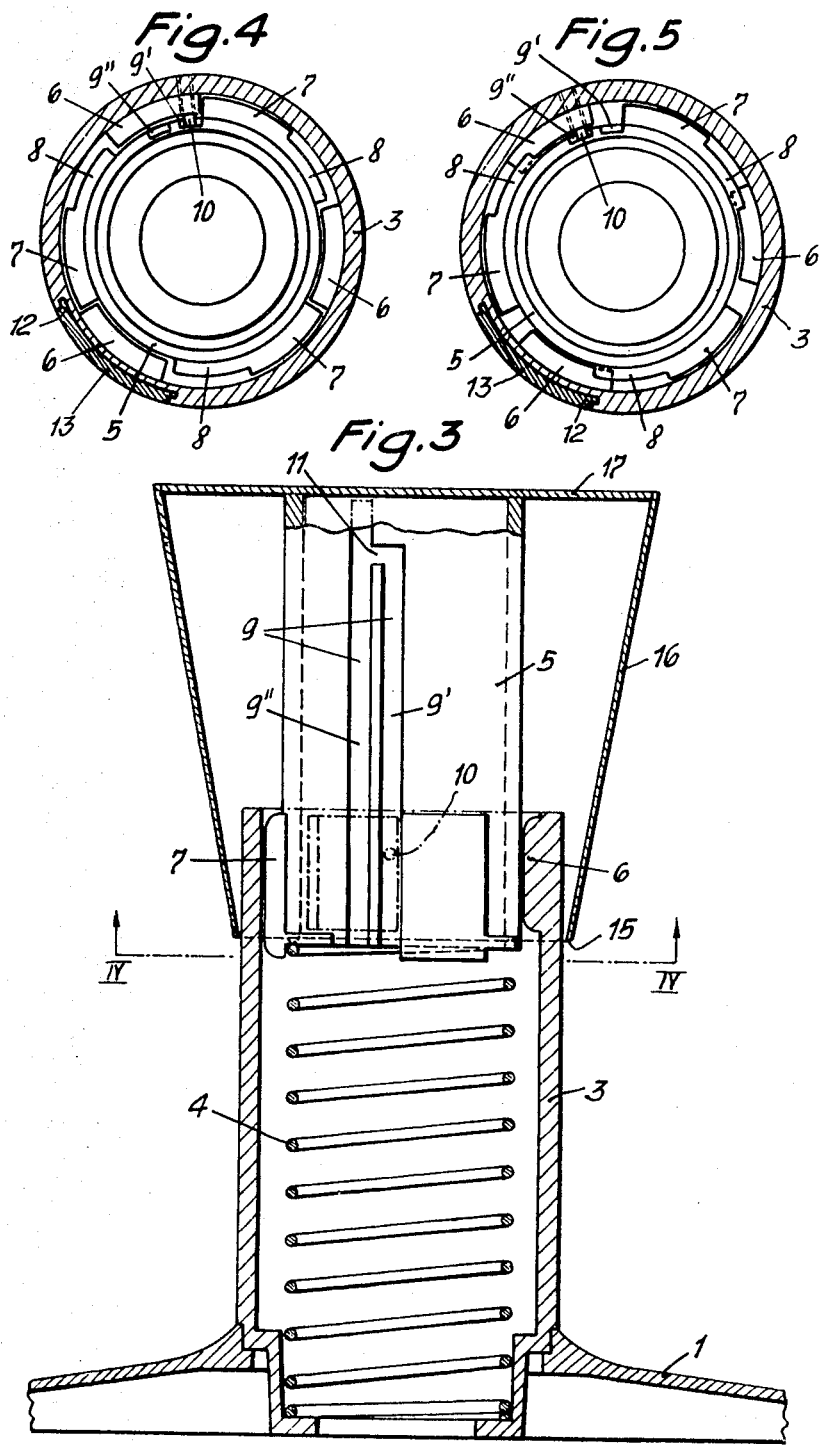

WEIGHING SCALE WITH CONTAINER STORAGE MEANS

Various types of household balances are known, some of which are working with weights others with springs. Balances provided with scales for taking up of the goods to be weighed are characterized by their quite large space requirements and, when not in use, their requiring of a special casing, which means additional space requirement. In the trade and in households where the balance is not constantly in use the above mentioned disadvantage is very much felt, when the balance has to be stored on shelves or in cupboards. Not only if idle but also for moving and storing the need of space as well as of special locking packaging devices are found to be expensive and unpractical. Moreover, the scales at hand for taking up the goods for weighing are unsuitable for any other purpose.

The object of the present invention is a multipurpose balance, particularly for household kitchens. This invention is characterized by a weighing apparatus provided with an up and down moving device for weighing and with at least one mounted overturnable receptacle, which can also be used for other purposes and which, after being turned upside down, can be clapped over and locked with the balance, thus forming a compact unit.

In the drawing an exemplary embodiment of the invention is shown as follows:

FIG. 1 represents a view of the balance with the belonging receptacles;

FIG. 2 represents the balance with the clapped over interlocked receptacles as a locked-up unit, when not in use;

FIG. 3 represents a vertical fragmentary section through the balance;

FIG. 4 represents a cross section along the line IV-IV of FIG. 3 in the pulled-out and pulled-in positions, respectively, of the movable carriage part; and FIG. 5 represents a corresponding cross section of the balance in the locked against pulling-out position of the movable balance part. The shown multipurpose balance comprises a support 1, attached thereto at the circumference two holding clamps 2 facing each other, and a hollow central column 3, as the stationary part of the balance. The inside of the hollow column 3 is provided with a screw spring 4 and a piston 5, supported by said screw spring 4, said piston 5 being the vertically movable part of the balance. The spring 4 grasps the hollow cylindrical piston 5 at its bottom front side, whereby the spring lies open at all times thus permitting a friction-free guiding of the piston and thereby ensuring accurate weight indication. On the interior top part of the hollow column 3 three equidistantly spaced guiding cams are arranged, and at the outer surface of the bottom part of the piston 5 three guiding cams 7 are positioned in the interspaces of the upper guiding cams 6, not hindering the pulling-out movement of the piston 5 from the hollow column. The backstop cams 8 are coordinated to the guiding cams 7, and depending on the turning position of the piston 5, these cams 8 give free or lock the pullout of piston 5 by colliding at a certain piston turning position with the cams 6 of the column 3. For the fixation of the turning position of the piston 5 a U-shaped guiding groove running in the longitudinal direction of the piston is provided, in which a guiding pivot 10 projecting from one of the guiding cams 6 engages at its open bottom part. In the sliding out position of the piston 5 the guiding pivot 10 of the hollow column 3 is playing freely in the groove legs 9', as shown in the FIGS. 3 and 4. By pressing in of the piston 5 against the action of the spring 4 the connection bar 11 of the groove 9 can be lead till to the guiding pivot 10 and can be brought into the groove leg 9'' by a small left-hand turn of the piston 5. In this turning position of the piston 5 the backstop cams 8 are brought into the collision range of the guiding cams 6, as shown in FIG. 5, thereby delimitating the moving range of the piston 5 and locking its pullout while weighing. The release of the pullout of the piston facilitates assembling as well as disassembling of the balance for cleaning purposes. In a vertical guiding groove 12 a weight scale 13 is arranged on the outside of the hollow column 3, this weight scale 13 is vertically adjustable and fixable by an adjusting screw 14. The scale 13 allows weight readings of the goods to be weighed from 0—1 kg., and by graduation marks from 50 to 50 g., additional reading from 25 to 25 g. Serving as indicator for weight reading on the scale is the opening edge 15 of a hollow conical coat 16 which is fastened by the bottom 17 of its widened part to the piston 5. This horizontal bottom 17 serves for putting upon or carrying the respectively used cup-shaped containers 18 for the goods to be weighed, as shown in FIG. 1. In the shown embodiment three containers 18 are provided as attachments to the balance. These containers are identical in size and shape. They are conically widened from the bottoms to the tops, and therefore can be interlocked, as shown in FIG. 2. In this interlocked state the containers 18 can be put over the balance and fastened by the holding clamps 2 in such a manner that the balance and the containers form a compact unit, requiring little space for storing or shipment. The containers 18 are shaped in such a way that they may be used in the household for other purposes too, such as keeping or mixing of foodstuff, etc.

In the state shown in FIG. 2 the spring is lightly compressed, thus exerting an upward directed tension pressure, whereby the containers 18 are spring-elastically held in place and not lying in a loose manner only one on top of the other. When the interlocked containers are pressed down, the action of the spring has to be overcome before the containers engage in the holding clamp. If the clamps 2 are simultaneously pressed outwards and released, the spring 4 together with the piston 5 are snapping upwards thereby somewhat lifting the containers. Thus the latter are moving out of reach of the holding clamps 2.

The described multipurpose balance possesses an adequate accuracy of weighing for the normal use, such as household and kitchen use, and thanks to its simple design and the protective casing built by the overturned containers, as shown in FIG. 2, it possesses also the best resistance conceivable against damage when used or shipped. Additional advantages are its low weight, its beautiful shape and the modest storage space requirement. This last feature is of essential practical importance especially when the balance is not used or stored. Changing from overturning of the containers upon the balance, as shown in FIG. 2, to the state of use, as shown in FIG. 1, and vice versa can be performed within seconds.

I claim:

1. A multipurpose scale construction comprising:
   a. a base member,
   b. compressible spring means mounted on said base member,
   c. a platform secured to said spring means opposite said base member,
   d. at least one cup-shaped container comprising a bottom and sidewalls for holding material while being weighed on said platform, and
   e. clip means mounted on said base for engaging and retaining in position the sidewalls of said container when said container is inverted to cover said platform and spring means to protect parts of the scales when said scales are not in use.

2. A scale construction as claimed in claim 1 wherein the distance between said base member and said platform when said spring means is not compressed is greater than the distance between the base and the open edge of the sidewalls of said cup-shaped container such that the bottom of said container contacts said platform compressing said spring means when said container is retained in position by said clip means.

3. A scale construction as claimed in claim 1 wherein said clip means comprises at least two holding clamps equidistantly spaced about the periphery of said base member.

4. A scale construction as claimed in claim 1 comprising a plurality of said cup-shaped containers which are capable of being nested, said clip means being capable of engaging the sidewall of the outermost container when said containers are nested to retain said plurality of containers in position when said scales are not in use.